J. T. REFSAHL.
HACKSAW.
APPLICATION FILED AUG. 30, 1911.
1,051,761.
Patented Jan. 28, 1913.
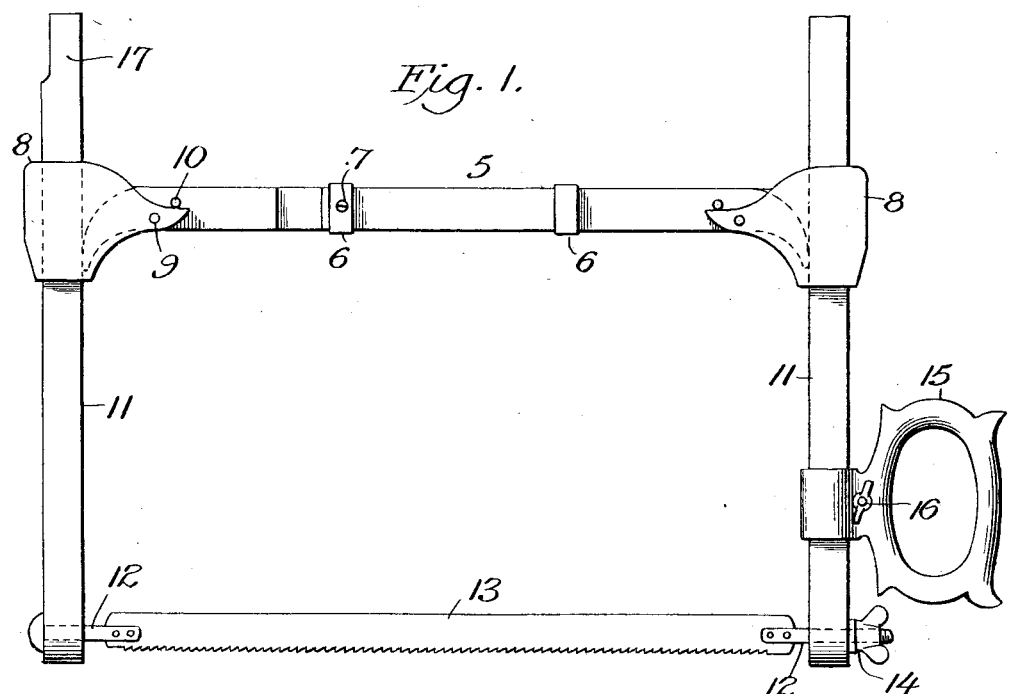
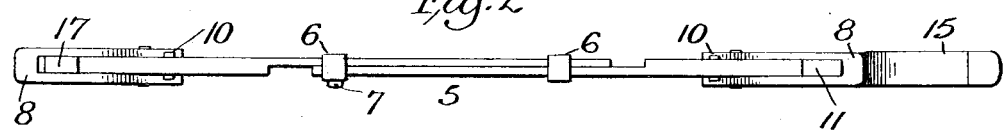
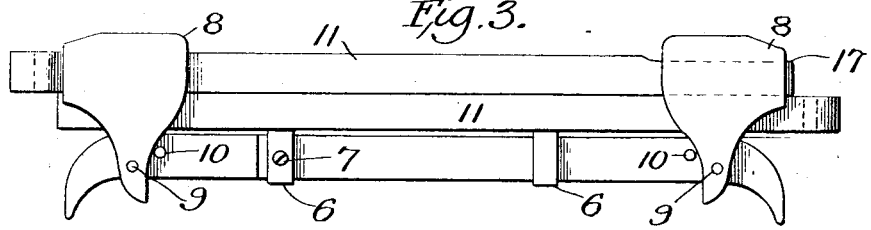
WITNESSES
James T. Duhamel
Geo. Ackman Jr.
INVENTOR,
John T. Refsahl,
BY
Victor J. Evans
ATTORNEY

UNITED STATES PATENT OFFICE.

JOHN TH. REFSAHL, OF BROOKLYN, NEW YORK.

HACKSAW.

1,051,761. Specification of Letters Patent. Patented Jan. 28, 1913.

Application filed August 30, 1911. Serial No. 646,781.

*To all whom it may concern:*

Be it known that I, JOHN T. REFSAHL, a subject of the King of Norway, residing at 14 Suydam Place, Brooklyn, in the county of Kings and State of New York, have invented new and useful Improvements in Hacksaws, of which the following is a specification.

This invention relates to hack saws and its object is to provide a collapsible device which may be quickly and easily folded so as to occupy a small amount of space when not in use as will be more fully described in the following specification, set forth in the claim and illustrated in the drawings, wherein,—

Figure 1 is a side elevation of the saw ready for use. Fig. 2 is a plan view of same. Fig. 3 shows the frame collapsed and folded.

The invention consists primarily of an extension bar 5, made of two parts and having straps 6 to embrace each other so that the device may be adjusted to certain points and secured thereat by a screw 7 or other means. Each end of the bar 5 is rounded as shown by dotted lines in Fig. 1 and at these ends is pivoted a slotted block 8 which straddles the bar and swings on its pivot about the rounded end of the extension bar. The bar also carries stops 10 to limit the movement of the block at a point where its outer sides will be vertical. Within the slotted block is carried the vertical arms 11, and the space within the block is such that when same is carried to its proper position, the rounded ends of the bar bear against the vertical pieces 11 and force them against the walls of the block, thus retaining them rigidly and preventing any movement of same.

The lower ends of the vertical arms 11 are perforated to receive the pins 12 of the saw 13, and one of the pins is threaded to receive a nut 14 by which it may be adjusted in the arms 11 and sufficient tension put on the saw to cause the arms to bind in the blocks 8.

When the saw is extended as shown in Fig. 1, a handle 15 may be clamped to one of the arms by means of a screw 16, and the tool thus completed. The object of this invention being to provide a collapsible tool, it may be reduced to a very small space by removing the saw 13 and the handle 15. The arms 11 are then free to be turned to a horizontal position, the blocks 8 swinging with them, and as the distance between the ends of the bar and the upper side is considerable, it is sufficient to allow both of the arms 11 to be slid within the slot in the blocks and the compact device provided as shown in Fig. 3. The end 17 of one of the arms is cut away in order to force it beneath the inner wall of one of the blocks in order to wedge same therein.

The saw and handle may be packed or wrapped with the tool when folded and easily carried in the pocket of a workman or in a smaller bundle.

It is obvious that the parts may be otherwise arranged and modified without departing from the essential features above described.

What I claim as new and desire to secure by Letters Patent is,—

A knock-down hack saw, comprising spaced arm members, a saw blade arranged between and removably and adjustably connected to the said arm members, an extensible bar having its opposite ends adapted for bearing on the opposed faces of the arm members, means for securing the sections of the bar in any of their extended positions, blocks having slots to receive the opposite end portions of the extensible bar and pivotally connected to the said bar, said blocks being channeled and each adapted for receiving one of the arms when the arms are in set up position and each further adapted for receiving one end portion of both arms when the said arms are disconnected from the saw blade and arranged parallel with the extensible bar.

In testimony whereof I affix my signature in presence of two witnesses.

JOHN TH. REFSAHL.

Witnesses:
JAMES F DUHAMEL,
CHARLES LA RUE.